United States Patent
Donato (10) Patent No.: US 8,305,198 B2
(45) Date of Patent: *Nov. 6, 2012

(54) ADAPTIVE CONTROL FOR IMPROVED RFID TRANSPONDER READ AND WRITE PERFORMANCE

(75) Inventor: Daniel F. Donato, Johnsburg, IL (US)

(73) Assignee: ZIH Corp., Hamilton Parish (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,755

(22) Filed: Mar. 15, 2011

(65) Prior Publication Data

US 2011/0169615 A1   Jul. 14, 2011

Related U.S. Application Data

(63) Continuation of application No. 11/297,164, filed on Dec. 7, 2005, now Pat. No. 7,936,252.

(51) Int. Cl.
*H04Q 5/22* (2006.01)

(52) U.S. Cl. .................. 340/10.51; 340/10.1; 340/572.1

(58) Field of Classification Search .................. 340/10.1, 340/10.2, 10.3, 10.4, 10.5, 10.51, 10.52, 340/572.1, 572.2
See application file for complete search history.

(56) References Cited

U.S. PATENT DOCUMENTS

| | | | |
|---|---|---|---|
| 5,657,066 A | 8/1997 | Adams et al. | |
| 5,978,004 A | 11/1999 | Ehrhardt | |
| 6,151,037 A | 11/2000 | Kaufman et al. | |
| 6,481,907 B2 | 11/2002 | Banach et al. | |
| 6,848,616 B2 | 2/2005 | Tsirline et al. | |
| 7,142,815 B2 | 11/2006 | Desjeux et al. | |
| 7,190,270 B2 | 3/2007 | Brown et al. | |
| 7,504,950 B2 | 3/2009 | Torchalski | |
| 2002/0167397 A1 | 11/2002 | Eroglu et al. | |
| 2003/0063001 A1 | 4/2003 | Hohberger et al. | |
| 2005/0274799 A1 | 12/2005 | Torchalski et al. | |

FOREIGN PATENT DOCUMENTS

| | | |
|---|---|---|
| EP | 1 394 719 A | 3/2004 |
| WO | WO 01/35320 A | 5/2001 |

OTHER PUBLICATIONS

International Search Report for PCT/US2006/046654, mailed Jun. 1, 2007.

*Primary Examiner* — Nabil Syed (74) *Attorney, Agent, or Firm* — Alston & Bird LLP (57) ABSTRACT

System, methods and computer program product are provided for an adaptive control for adjusting the electromagnetic interrogation signal of an RFID transceiver where said signal is used to read and/or write to an RFID transponder, or to adjust the gain of the RFID transceiver, or adjust both the gain and the signal strength. The system includes a RFID transceiver having at least a transmitter portion and a receiver portion and capable of generating electromagnetic signals, a signal-to-noise ratio module, and an adaptive control module that adjusts the power of the electromagnetic signal of the transmitter portion or the gain of the receiver portion according to the signal-to-noise ratio of a first electromagnetic signal. In one embodiment the system may be employed in printer-encoder devices for reading or encoding RFID transponders during a printing process.

12 Claims, 11 Drawing Sheets

FIG. 12

ADAPTIVE CONTROL FOR IMPROVED RFID TRANSPONDER READ AND WRITE PERFORMANCE

CROSS-REFERENCE TO RELATED APPLICATIONS

This application is a continuation of U.S. application Ser. No. 11/297,164, filed Dec. 7, 2005 now U.S. Pat. No. 7,936,252, which is hereby incorporated herein in its entirety by reference.

BACKGROUND OF THE INVENTION

1. Field of the Invention

The present invention relates to RFID transponders and in particular reading and writing to RFID transponders using adaptive control of the RFID transceiver.

2. Description of Related Art

Radio frequency identification (RFID) transponders, either active or passive, are typically used with an RFID transceiver or similar device to communicate information from the transponders. RFID transponders are known in the art and are available in various frequencies including 860-930 MHz, 13.56 MHz, and 125-130 KHz, though this invention contemplates within its scope RFID transponders of any frequency and those that may be later developed. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by modulating the field in a well-known technique called backscattering. In the case of an active transponder, the transponder may respond to the electromagnetic field by transmitting an independently powered reply signal to the transceiver.

An interrogating electromagnetic signal is used to activate an RFID transponder, read information from an RFID transponder, and encode (write) information to an RFID transponder. Generally, read/write/activate electromagnetic signals are of fixed strength, where such fixed strength is determined empirically through a series of laboratory tests usually from a small sample of RFID transponders. If the fixed strength signal is too strong, then the RFID transponder may be physically damaged. If the signal is too weak, then the transponders may not be encoded properly or may fail to be activated for transmitting their information.

Challenges can also occur when interrogating multiple adjacent transponders regardless of whether the transponders are passively or actively powered. For example, in some applications it may be desired to only interrogate a single RFID transponder at a time, and a strong interrogating electromagnetic signal may activate more than one transponder at a given time. This simultaneous activation of multiple transponders may lead to communication, i.e. read and write errors because each of the multiple transponders may transmit reply signals to the transceiver at the same time. This is particularly problematic if the interrogating electromagnetic signal is strong and the RFID transponders are in close proximity. Furthermore, if interrogating multiple RFID transponders simultaneously, those closest to the transceiver supplying the interrogation signal may have their electronics damaged if the interrogating signal is overly strong.

It is known in the art that some RFID transponders need a more powerful interrogating signal to perform read/write/activate operations, where others need a less powerful signal. This can be attributed to, at least in part, variations in the chips used to manufacture the RFID transponders, bonding quality, contaminants, etc. This may also be the result of fundamental differences in the design of various RFID transponders. In some previous instances when a RFID transponder is not read or encoded on a first attempt, the read or encode signal strength is incrementally increased after each attempt until the read or encoding is successful or it is determined that the operation is improbable. This process requires multiple read or encode attempts and at least one power increment step and can slow down RFID transponder processing. Various other techniques of varying output power have also been employed in order to change the range of an encoding antenna and to locate the position of an RFID tag on a media strip, including a technique for locating such antenna to facilitate the throughput of RFID tags. Such techniques are described more fully in the following commonly-assigned U.S. patent application Publications and U.S. patents: U.S. Patent Application Publication No. 2005/0274799 (Apparatus and Method for Communicating with an RFID Transponder), published on Dec. 15, 2005; U.S. Pat. No. 7,190,270 (System and Method for Detecting Transponders Used With Printer Media), issued on Mar. 13, 2007; and, U.S. Pat. 7,504,950 (System and Method for Continuous RFID Encoding), issued on Mar. 17, 2009, each of which are fully incorporated herein by reference and made a part hereof.

Furthermore, in some RF applications where singulated RFID transponder processing is desired, the challenge of avoiding or processing multiple transponder activation is especially troublesome. RF printer-encoders are one example. RF printer-encoders are devices capable of programming and printing a series or stream of transponders. The close proximity of the transponders and space, cost, and weight restrictions associated with such devices make multiple transponder activation problematic. Furthermore, the space, cost, and weight restrictions, among other factors, make anti-collision management techniques or shielding components for alleviating multiple transponder activation less than desirable.

In light of the foregoing it would be desirable to provide an RF system or device capable of quickly determining a signal strength for a transceiver's electromagnetic signal for efficiently reading and/or writing to an RFID transponder. It would also be desirable to provide an RF system or device capable of interrogating individual transponders positioned among multiple adjacent transponders where such system is adaptive to different transponder configurations and placements. It would also be desirable to provide an RF system or device capable of interrogating multiple adjacent transponders where such system is adaptive to different transponder configurations and placements.

BRIEF SUMMARY OF THE INVENTION

The present invention addresses the above challenges by providing an adaptive control for adjusting an RFID transceiver that is used to read and/or write to a passive RFID transponder. The system includes a RFID transceiver capable of generating electromagnetic signals, a signal-to-noise ratio module, and an adaptive control module that adjusts the transceiver according to the measured signal-to-noise ratio of the received signal from the RFID transponder. In one embodiment, the signal-to-noise ratio is used by the adaptive control module to adjust the signal strength of the RFID transceiver's signal. In another embodiment, the adaptive control module uses the signal-to-noise ratio to adjust the RFID transceiver's gain. In various aspects, the RFID transceiver, signal-to-noise ratio module, and the adaptive control module are combined in various combinations to form one or more physical devices.

In one embodiment of a method of use of the above-described system, a first electromagnetic signal is directed toward one or more RFID transponders and the subsequent response signals from the one or more RFID transponders are analyzed by a signal-to-noise ratio module to determine the signal-to-noise ratio of the received signal from each of the one or more RFID transponders. From this signal-to-noise ratio, the actual power of the received signal (not including the noise signal) can be determined. The determined actual power of the received signal is then used to calculate the signal strength of a write signal used to encode the transponder or a read signal used to read information from the RFID transponder. Generally, a write signal's power level is a fixed offset from the strength of a read signal.

In another embodiment of a method of use of the above-described system, a first electromagnetic signal is directed toward one or more RFID transponders and the subsequent response signals are each analyzed by a signal-to-noise ratio module to determine the signal-to-noise ratio of the received signal from each of the one or more RFID transponders. From this signal-to-noise ratio, the gain of the receiving portion of the RFID transceiver is adjusted such that the RFID transceiver can better discern the signal of each of the one or more RFID transponders from surrounding noise.

In one aspect of the present invention, the system is employed in an RF printer-encoder capable of printing on media such as paper, plastic, etc. and/or encoding one or more RFID transponders with data where a sample of the RFID tags to be encoded are used to determine the strength of the electromagnetic signal used to encode the RFID transponders. In one aspect the sample size is 100 percent, or all the transponders to be encoded, whereas in other aspects the sample size may be determined statistically or randomly.

In another aspect of the present invention, the system is employed to determine the signal to noise ratio of signals received from a plurality of RFID transponders, where the obtained signal to noise ratio is used to adjust the strength of a signal used to read or encode each of the plurality of RFID transponders.

These and other aspects of the present invention are described more fully herein.

BRIEF DESCRIPTION OF THE SEVERAL VIEWS OF THE DRAWING(S)

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Block Diagrams, Flow Charts and Computer Program Product

The present invention is described with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

The present invention concerns an apparatus, method and computer program product for enabling an RFID transceiver (sometimes referred to as an "interrogator" or "reader") to adaptively control either the power of an electromagnetic signal directed toward a particular RFID transponder, or to adjust the gain of the transceiver's receiving portion, or combinations of both, as such parameters have been adjusted according to the signal-to-noise ratio of a signal received from said particular RFID transponder. RFID devices contemplated under the scope of this invention includes devices that comply with recognized standards including the International Organization for Standardization (ISO) 18000-6 standard, including but not limited to ISO 18000-6 types A and B. ISO 18000-6 covers the air interface for RFID tags operating at ultra high frequency (860-930 MHz). The RFID device also includes devices that comply with the other parts of the ISO 18000 standard (e.g., 18000-1, 18000-2, etc.), as such parts are approved and adopted. The ISO 18000-6 standard, and all variants (e.g., Type A, B, C, etc.). Other RFID standards contemplated include ISO 11784 & 11785, ISO 14223/1, ISO 10536, ISO 14443, and ISO 15693 each of which are incorporated in their entirety by reference and made a part hereof The RFID device also includes devices that comply with Electronic Product Code (EPC) standards, specifications and guidelines as were initially developed by the Auto-ID Center, including but not limited to EPC classes 0-1. The EPC standards are also fully incorporated herein by reference and made a part hereof It is to be appreciated that the scope of RFID devices contemplated under this invention are not to be limited by this description of current RFID standards and that the scope of this invention also includes RFID devices that may be developed after the time of the invention and their standards as well as any later developed standards and RFID devices that are not covered by any standard.

In embodiments of the present invention, the power level of an interrogation signal may be adjusted for a particular RFID transponder or adjusted based on a sample of RFID transponders. Because of the ability to adjust the signal strength for each transponder or a batch of transponders, the risk of "overpowering" of transponders during interrogation, which may affect RFID transponders proximate to the particular transponder under interrogation or, in some instances, damage a transponder, is lessened. In embodiments where the gain of the RFID transceiver is adjusted, the problem of over-powering a transponder is generally avoided altogether. As will be apparent to one of ordinary skill in the art, various embodiments of the present invention are described below that enable RFID transceivers to adjust their signal strength or gain to different transponder requirements on a transponder to transponder basis or based on a statistical or random sample of a lot or batch of transponders.

Several embodiments of the present invention may be useful for reading, writing, or otherwise encoding active and/or passive transponders located on assembly lines, in high-speed production and packaging environments, in inventory management centers where on-demand RFID labeling may be needed, or in other similar circumstances. In various embodiments, one or more transponders are mounted to or embedded within a label, ticket, card, or other media form that may be carried on a liner or carrier. In alternate linerless embodiments, a liner or carrier may not be needed. In either case, such RFID enabled labels, tickets, tags, and other media forms are referred to collectively as "media units." It is often desirable to print to a media unit before, after, or during communications with its corresponding transponder. In such instances a printer-encoder is used to print the transponder or media associated with a transponder and to encode the transponder. Embodiments of the present invention may be incorporated within the functionality of such printer-encoders to facilitate interrogating transponders during encoding and to reduce the effect on proximate transponders while encoding or reading a particular transponder. It is to be appreciated that a printer-encoder is only one of many uses of the embodiments of the present invention.

Computer and Computer Hardware

Figure 1A:
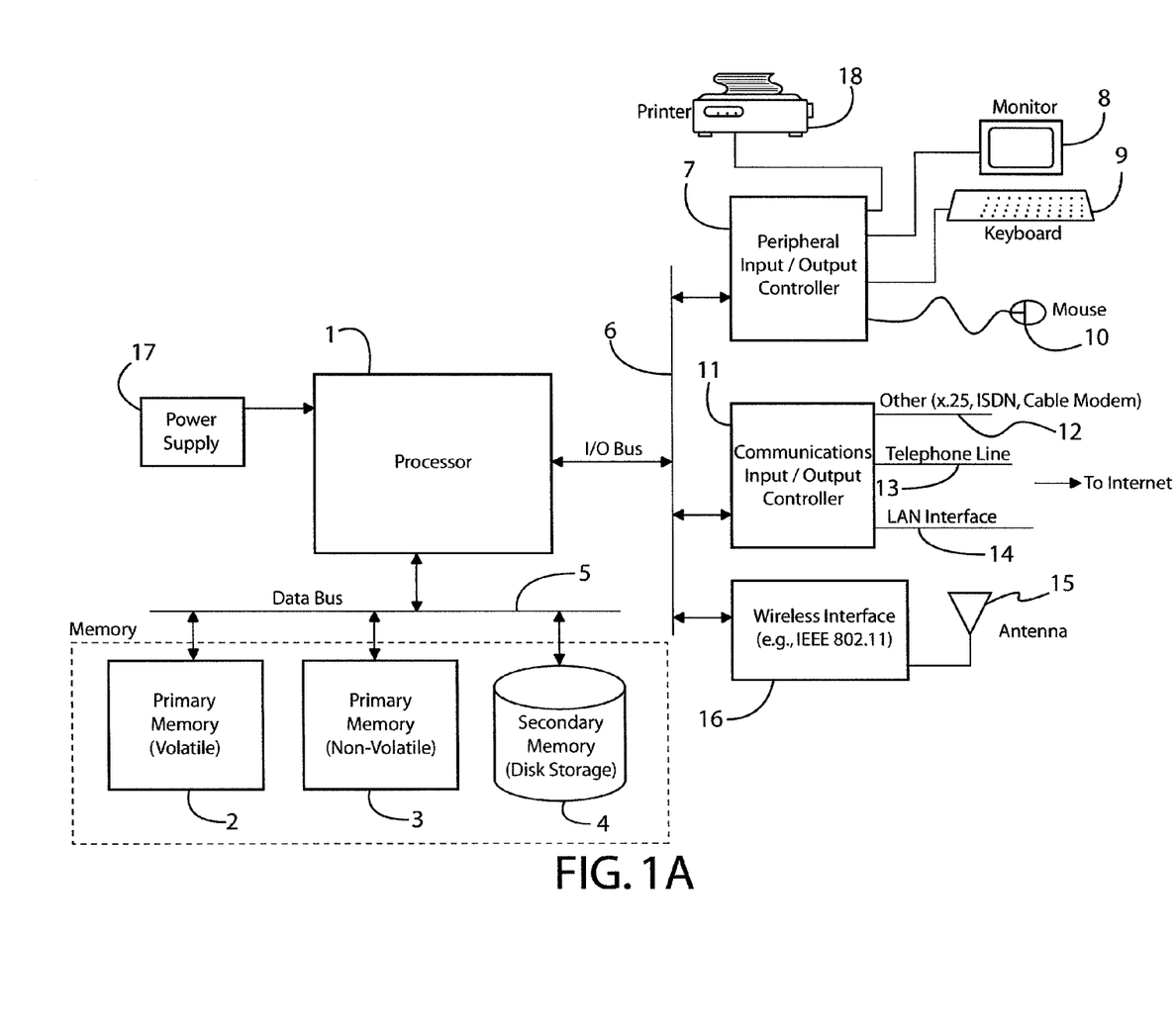
FIG. 1a is an illustration of an embodiment of a computer that can be used to practice aspects of the present invention.

In several of the embodiments of the invention referenced herein, a "computer" or "computing device" is referenced. The computer may be, for example, a mainframe, desktop, notebook or laptop, hand-held, hand held device such as a data acquisition and storage device, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16, 32, 64 or more bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, cellular (Advanced Mobile Phone Service or "AMPS"), Personal Communication Services (PCS), or a standard 3G wireless telecommunications protocols, such as CDMA2000 1×EV-DO, GPRS, W-CDMA, or other protocol.

Figure 1B:
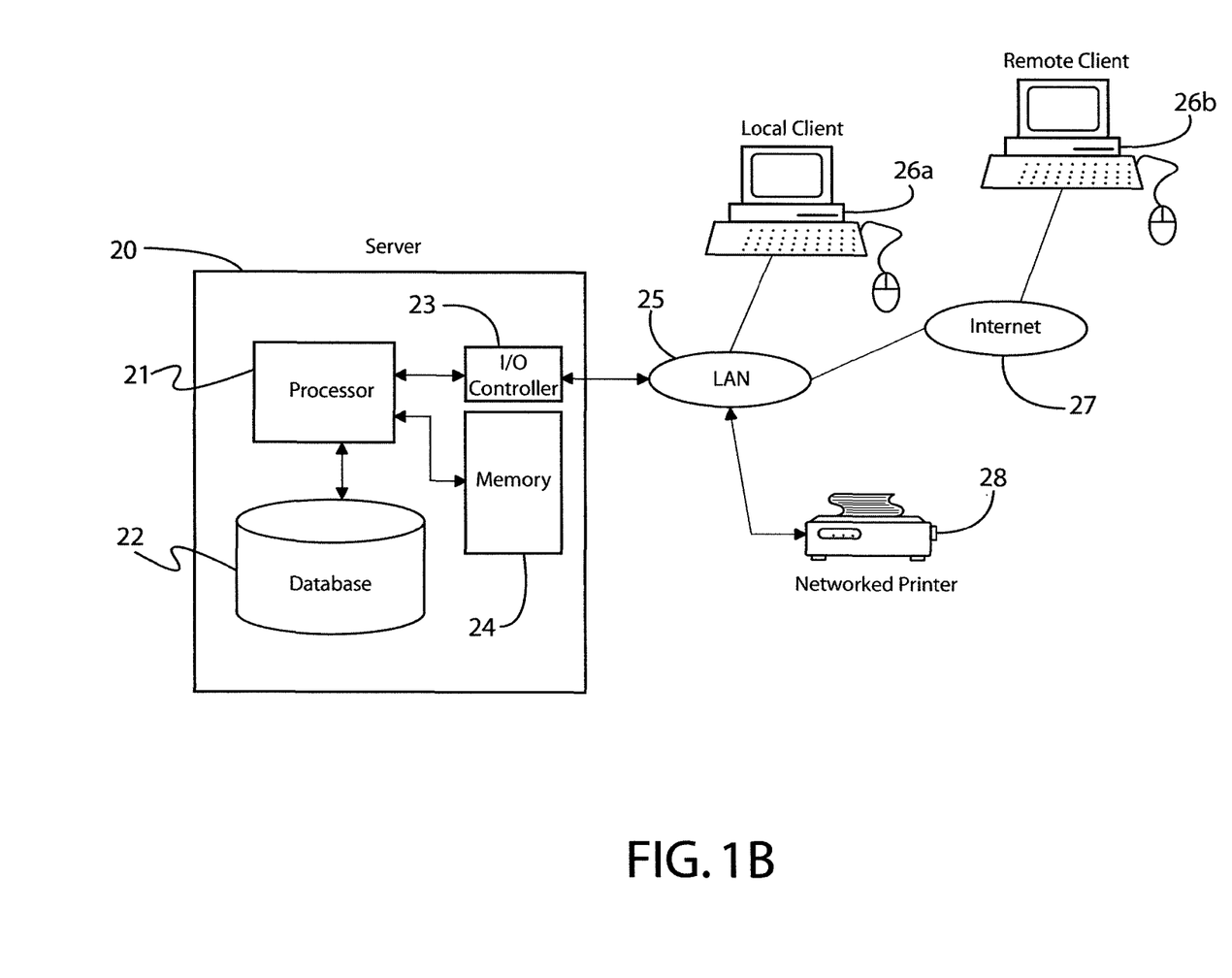
FIG. 1b is an alternative embodiment of the processing system of FIG. 1a that also may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible such as, for example, the handheld devices contemplated herein and can be used to practice the principles of the present invention. The embodiments illustrated in FIGS. 1a and 1b can be modified in different ways and be within the scope of the present invention as claimed.

RFID Enabled Printer Systems

The present invention has been depicted, for illustration purposes, in one embodiment in the context of an RFID enabled printer systems, also referred to herein as "printer-encoders" (e.g., thermal transfer printers, direct thermal printers, inkjet, dot matrix, electro-photographic printers, etc.). Examples of printer-encoders are disclosed in U.S. Pat. Nos. 6,481,907 and 6,848,616, both of which are hereby incorporated herein by reference. However, in various other embodiments the inventive concepts of the present invention may be applied to other RFID enabled systems in which it may be desirable to communicate with a plurality of passive or active transponders, selectively communicate with a single passive or active transponder or a single passive or active transponder that is disposed among multiple adjacent passive transponders.

Figure 2:
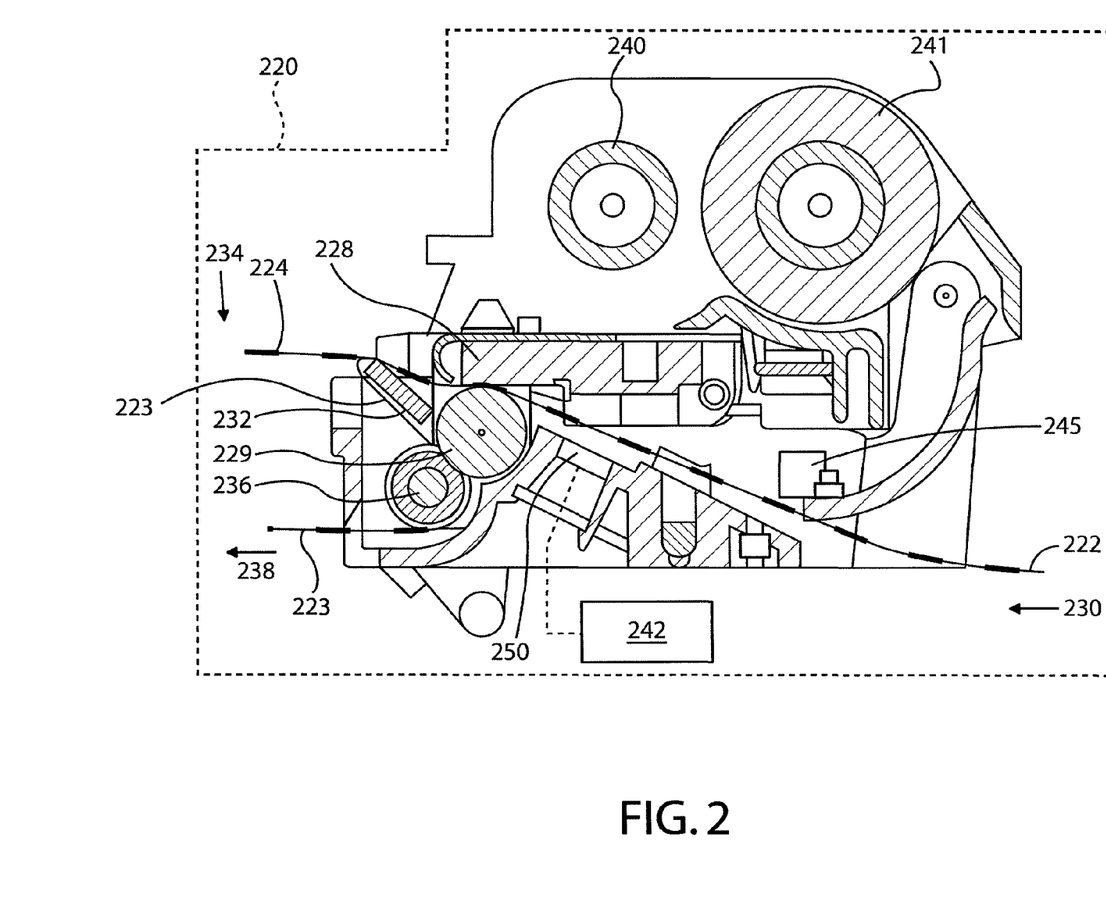
FIG. 2 is a side schematic view of a printer-encoder according to an embodiment of the present invention.

FIG. 2 illustrates an RFID printer-encoder 220 structured for printing and programming a series or stream of media units according to one embodiment of the present invention. The printer-encoder 220 includes a printhead sub-assembly comprising a conventional printhead 228 and a platen roller 229. As is further apparent, the depicted printer-encoder 220 also includes a ribbon supply roll 241 and a take-up spool 240 for delivering a thermal transfer ribbon (not shown for clarity) between the printhead 228 and the media units 224.

Figure 3:
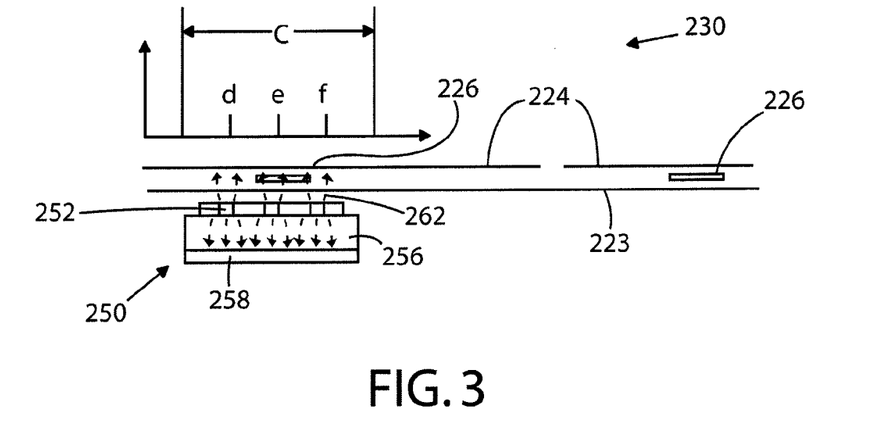
FIG. 3 is a simplified cut-away side view of a transponder-transceiver structure having a transceiver according to one embodiment of the present invention, illustrating schematically the transponder operating region and the near field effect pattern created by a plurality of radiating elements coupled to the transceiver.
Figure 4:
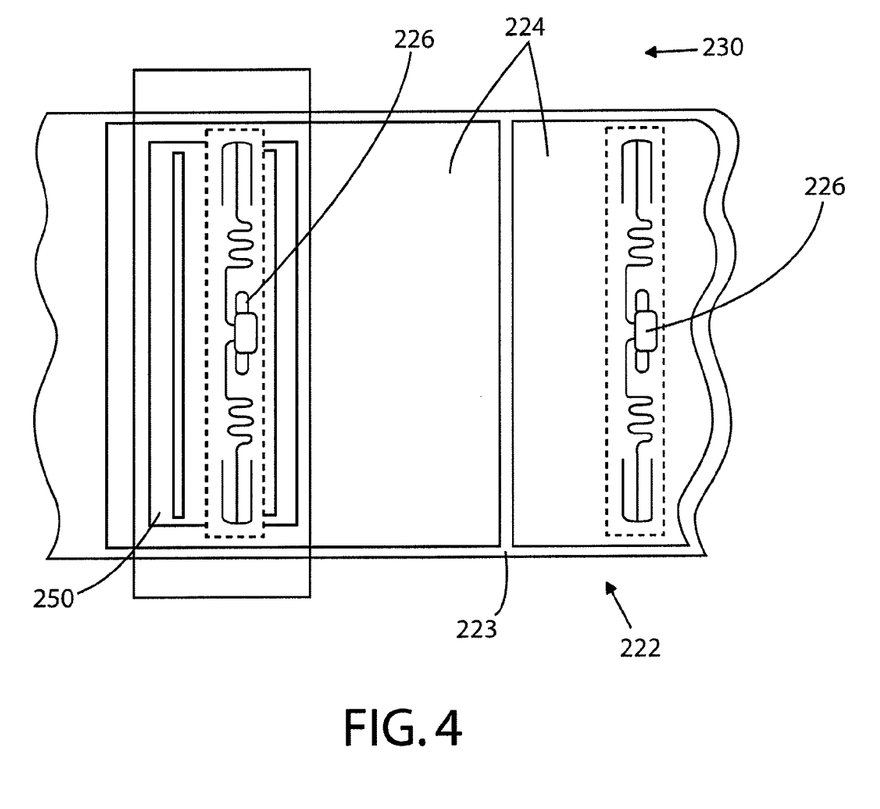
FIG. 4 is a partial cut-away top schematic view of a transponder according to an embodiment of the present invention and carrier substrate with embedded transponders.

In various embodiments and as shown in FIGS. 3 and 4, at least a few of the media units 224 include transponders 226. The individual media units 224 may be connected by a carrier substrate 223 that combines with the media units 224 to form a web 222. The web 222 is directed along a feed path 230, as shown in FIG. 3, under the printhead 228 and ribbon, and above the platen roller 229 for "on demand" printing of indicia such as text, bar codes, or graphics. Such on-demand printing operations are generally controlled by a computer, computer, controller, or microprocessor, as shown in FIGS. 1a and 1b, and may occur through a wired or wireless connection, or a combination thereof. Various techniques for printing indicia onto the media web 222 and devices for transmitting or conveying the web 222 comprising media units 224 through a printer-encoder 220 are known in the art, and, thus, such techniques and conveyance devices are not described in detail.

After printing and as shown in FIG. 2, the media web 222 proceeds to a media exit path 234 where the media units are typically individually removed from the web 222. For example, pre-cut media units 224 may be simply peeled from an underlying carrier substrate 223 of the web 222 at a peeler bar 232 as shown. In other embodiments, a web of multiple media units may be peeled and transmitted downstream to an in-line cutter for subsequent separation (not shown). Various other known media unit removal techniques may be used as will be apparent to one of ordinary skill in the art. In applications, such as the depicted embodiment, in which the media units 224 are supported by a carrier substrate 223, the carrier substrate 223 may be guided out of the printer-encoder 220 along a carrier exit path 238 by rollers 236 or other devices as shown.

In one embodiment of the present invention, the RFID printer-encoder 220 includes at least one transceiver 242 for generating RF communication signals that are transmitted proximate the media feed path 230. The transceiver 242 is also capable of receiving RFID signals transmitted from a RFID transponder. For purposes of the present specification and the appended claims, the transceiver 242 will be referred to as forming at least part of a communication system. As will be explained in more detail below, the communication system transmits a near field electromagnetic signal or pattern in proximity to a transponder operating region. The communication system is configured to establish, at predetermined transceiver power levels, a mutual coupling between the transceiver and a targeted transponder of a media unit that is located in the transponder operating region. More specifically and as best shown in FIGS. 3 and 4, as the media web 222 proceeds along the media feed path 230 through the transponder operating region C, data may be read from or written to each transponder 226 disposed on media units 224 carried by the web 222.

Figure 5:
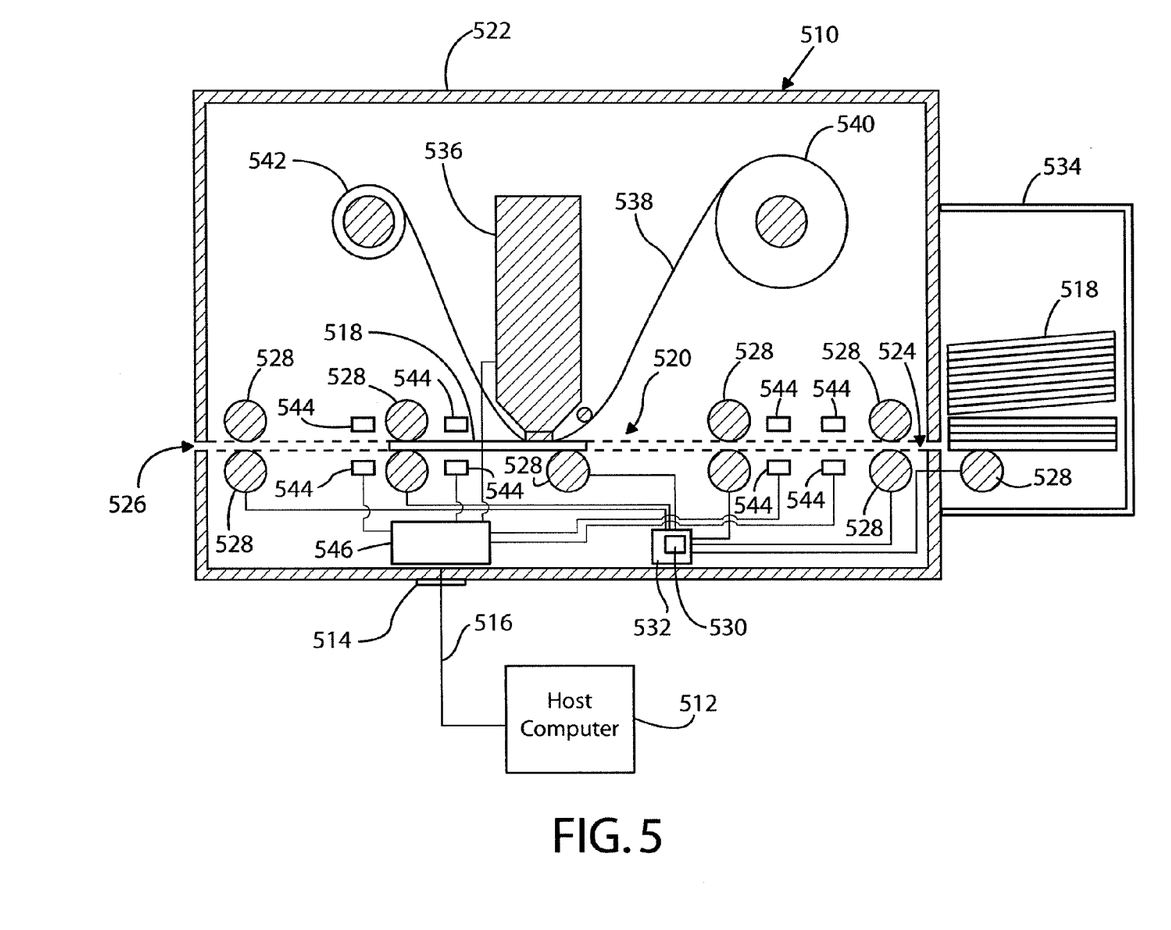
FIG. 5 is a section view schematically illustrating a printer according to another embodiment of the present invention.
Figure 6:
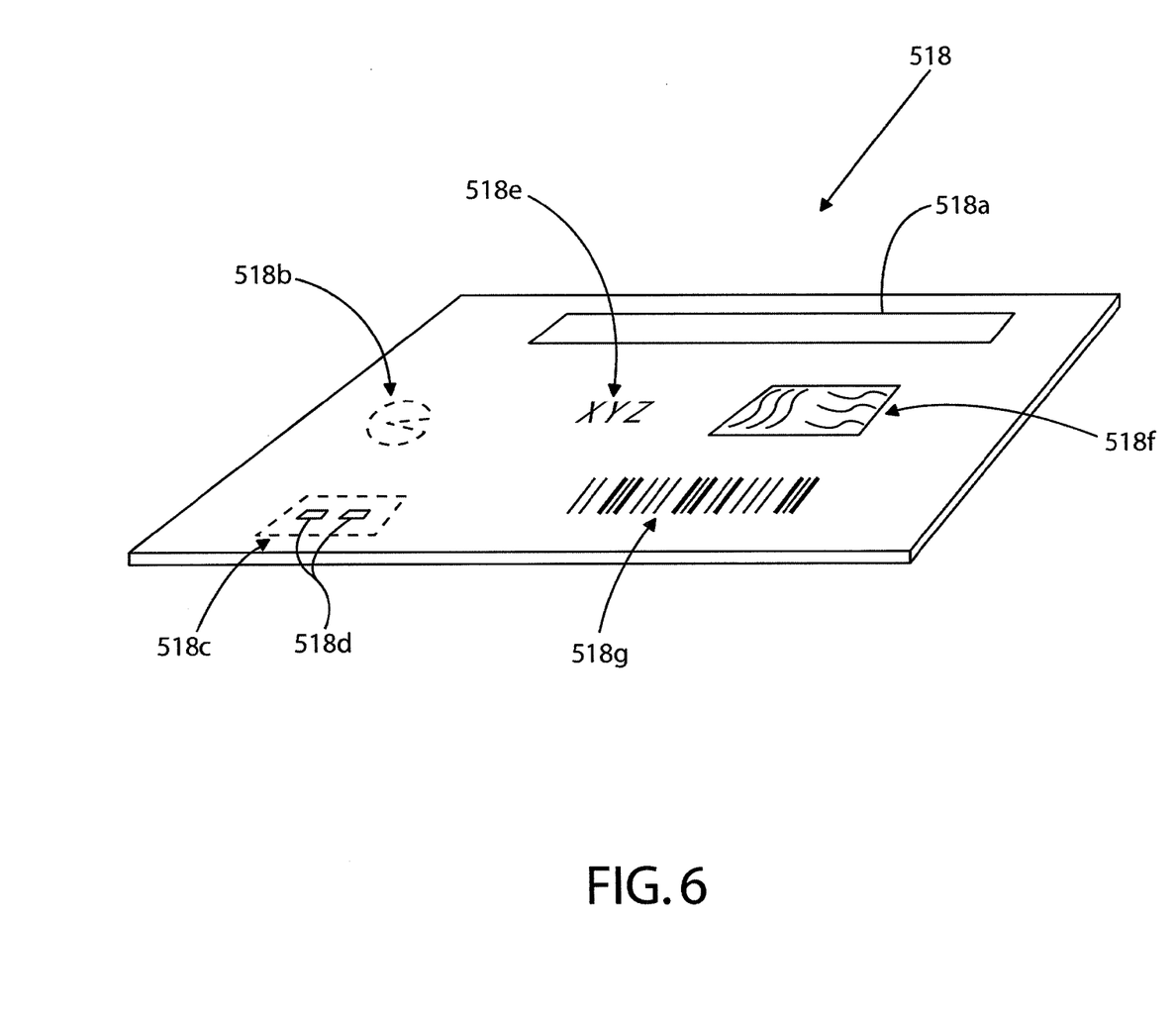
FIG. 6 is a perspective view illustrating an exemplary media card that can be processed with a printing and reading/writing operation of the printer of FIG. 5 according to another embodiment of the present invention.

FIG. 5 is another embodiment of a printer 510 according to the present invention. The printer 510 is electrically connected to a host computer 512 via an input/output (I/O) port 514 and a data communication cable 516. The printer 510 illustrated in FIG. 5 is adapted for printing cards 518, such as information cards. As shown in FIG. 6, the card 518 can include one or more magnetic strips 518a, contactless devices such as RFID tags 518b, contact devices such as an integrated circuit 518c with a memory and contact terminals 518d, fluorescent text 518e, holograms 518f, a barcode 518g or otherwise encoded pixilated image, or the like.

The printer 510 can include features of the P310i Printer available from Zebra Technologies Corp., which is generally configured for printing cards. However, it is appreciated that the printer 510 can alternatively be adapted to receive other types of media such as labels, paper or cardboard sheets or strips, envelopes, tickets, and the like. As illustrated in FIG. 5, the printer 510 defines a feed path 520 that extends through a housing 522 of the printer 510 from an entrance 524 to an exit 526. The feed path 520 generally defines the path of travel of the media, such as the plastic cards 518, through the printer 510. Rotatable rollers 518 or other media support and transport devices, such as one or more belts, are provided along the feed path 520 to feed the media therethrough. The rollers 528 are typically rotated by one or more electric motor 530, which is controlled by a motor driver 532, to feed the cards 518 or other media along the feed path 520 through the printer 510 during operation. Thus, during a typical printing operation of the printer 510, a stack of the cards 518 can be provided in a hopper 514 proximate to the entrance 514 of the feed path 520, and the cards 518 can be individually fed from one side of the stack and then fed along the feed path 520 to the exit 526.

As is known in the printing industry, a head 536 of the printer 510 can be a device for disposing a dye onto stock media. For example, a thermal dye ribbon 538 can extend from a supply spool 540 to a take-up spool 542 with the ribbon 538 disposed between the head 536 and one of the cards 518 in the feed path 520. Dyes of one or more colors are disposed on the ribbon 538, and the head 536 is configured to press the ribbon 538 against the card 518 and/or heat the ribbon 538 at particular locations so that the dye in the particular locations of the ribbon 538 is transferred to the card 518. Such a thermal printing operation is described, e.g., in U.S. Pat. No. 6,151,037 to Kaufman, et al.; U.S. Pat. No. 5,978,004 to Ehrhardt; and U.S. Pat. No. 5,657,066 to Adams, et al., each of which is assigned to the assignee of the present application, and the contents of each of which are incorporated herein in their entirety by reference.

Thus, as each card 518 is fed along the feed path 520 of the printer 510, the head 536 can dispose one or more colors onto the card 518 in a predetermined pattern. In some cases, the ribbon 538 can define repeating frames of panels, each panel having a dye of a different color than the other panels of the same frame. For example, each frame can include panels that are yellow, magenta, and cyan, respectively. The cards 518 can be alternately advanced and retracted in opposite directions along the feed path 520 so that each card 518 is fed under the head 536 multiple times, during which the head 536 can print different colors from the different panels of a frame.

The printer 510 is also configured to communicate data to and/or from the media using one or more communication devices 544. The devices 544 can generally be used to read data from the media and/or write data to the media. For example, one or more of the devices 544 can be adapted to communicate with a particular type of electronic storage device provided on the media, i.e., on a surface of the media, embedded within the media, or otherwise associated with the media. Thus, the printer 510 can be used to selectively communicate with the media according to the type of media and the desired form of data storage. In fact, the printer 510 can be used to process various types of media and can communicate accordingly using one or more protocols for each media. The communication devices 544 can be disposed on either or both sides of the feed path 520, and, as illustrated in FIG. 5, the devices 544 can be located at various positions throughout the printer 510. In one particular embodiment, the printer 510 includes two or more communication devices 444 that are disposed internal to the housing 522 of the printer 510 and configured to communicate using at least two different protocols. Any number of the communication devices 544 can be activated during the processing of each media.

In one embodiment, one or more of the communication devices 544 can be a modular component that can be easily replaced without significantly interrupting the operation of the printer 510. For example, each of the communication devices 544 disposed within the housing 522 of the printer 510 can be configured to be interchangeable with each other and/or with other communication devices. That is, the communication devices 544 can be similar in size, shape, or other physical configuration. In some cases, the communication devices 544 can also be configured to connect to the printer 510 using similar electrical connections. Thus, the communication devices 544 can be quickly and easily replaced, e.g., if it is desired to communicate with the media using a communication device that is not presently provided in the printer 510, to adjust one of the communication devices 544 in a particular position or orientation to correspond to a particular type of media being processed, or if any of the communication devices 544 requires maintenance or repair.

The printer 510 includes a controller 546 for communicating with the host 512 and controlling the operations of the printer 510. As shown in FIG. 5, the controller 546 can be a single integral device that controls the feeding, printing, reading, writing, and other operations of the printer 510. However, it is also appreciated that the functions of the controller 546 can be shared by multiple devices, such as a separate print controller, communication controller, motor driver controller, and the like.

Embodiments of Systems of the Invention

Figure 7A:
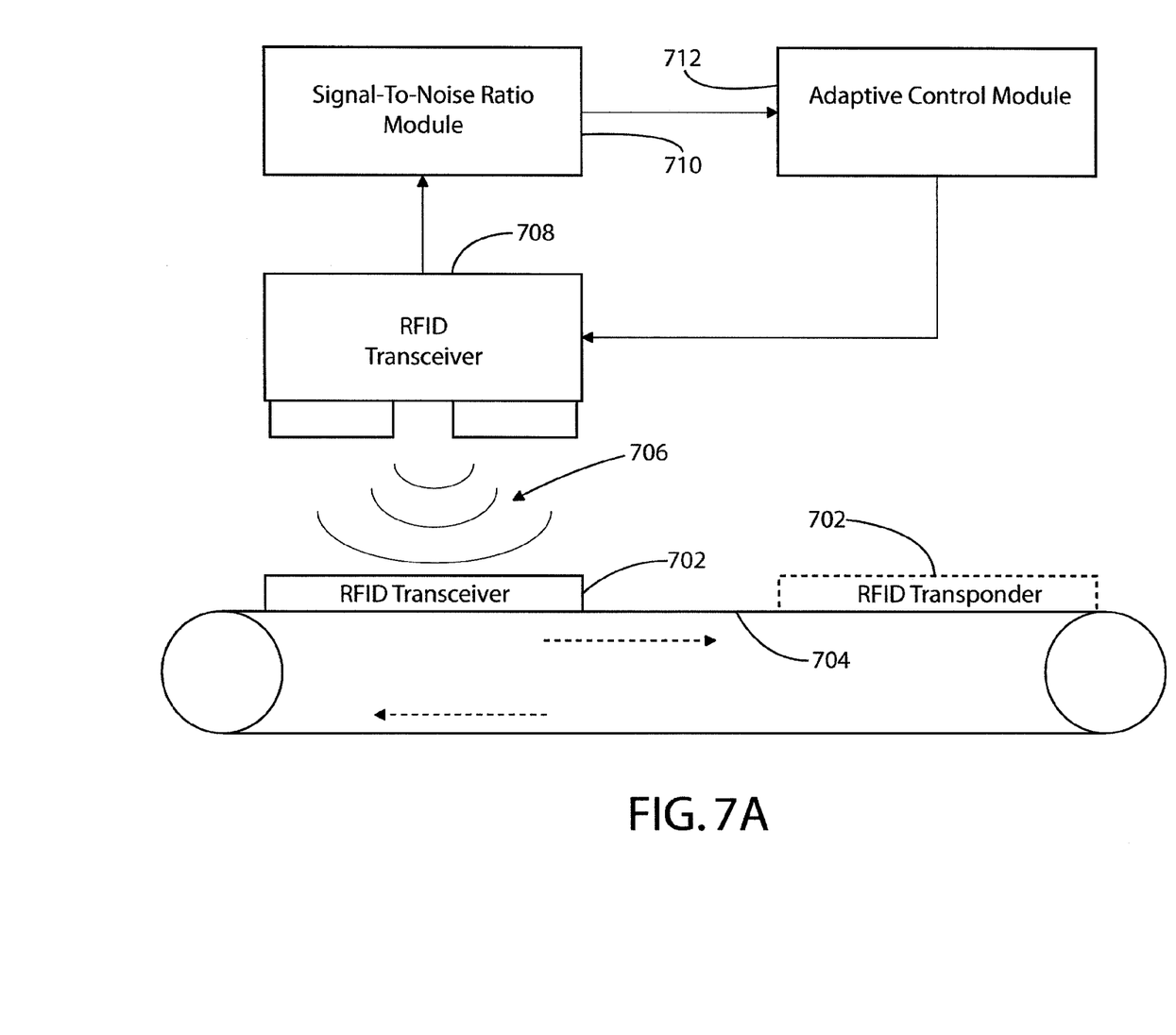
FIG. 7A is a block diagram of an embodiment of a system used to practice the invention.

In one embodiment, the communication devices 544 of FIG. 5 is an RFID transceiver. FIG. 7A is a block diagram of an embodiment of an RFID transceiver that can be used to read and/or write to an RFID transponder. As a transponder 702 moves along a media path 704 and enters a transponder operating region 706 it receives an electromagnetic signal from the transceiver 708. It is to be appreciated that in other embodiments RFID transponders may be brought into the transponder operating region 706 by means other than a media path and may be done so in a non-singulated manner. It is also contemplated in the embodiments of the invention that the RFID transceiver may be moved to bring RFID transponders into the transponder operating region 706, or the RFID transponders and the RFID transceiver may be moved to bring the RFID transponders within the transponder operating region 706. Regardless of the means for the RFID transponders being within the transponder operating region 706, the signal causes the transponder 702 to respond by transmitting a response signal. The response signal is received by the transceiver 708. The transceiver 708 provides the received response signal to a signal-to-noise module 710 that determines the signal-to-noise ratio (SNR) of the received response signal. The determination of a signal-to-noise ratio is known in the art and a SNR generally indicates the strength of a signal over background "noise." In this instance the SNR provides information about the inherent "noise" of the transponder 702, the transceiver 708 and any surrounding noise.

Based upon the SNR as determined by the signal-to-noise ratio module 710, an adaptive control module 712 either regulates the signal strength of the RFID transceiver 708 for reading and/or writing (i.e., encoding) the transponder 702 or adjusts the gain of the transceiver 708 such that the transceiver 708 is better able to discern the transponder 702 signal from noise.

In one embodiment, the strength of the interrogation signal of the transceiver 708 that is used to either read or encode the RFID transponder is adjusted. In this embodiment, the adaptive control module 712 sets a threshold value for the transceiver's electromagnetic interrogation signal such that signal losses attributable to noise are accounted for and the likelihood of a successful read and/or write operation is enhanced. RFID transponders generally have a set value or range for the signal strength to encode or read the transponder. This value or range may vary depending upon the manufacturer, size, frequency, design and other variables associated with the transponder. The signal to noise ratio indicates the losses in signal strength for communications between the transceiver and the transponder. For instance, if the SNR of the received signal was determined by the signal-to-noise ratio module 710 to be 20/1, then for every 20 units of signal strength, one unit is lost as noise. Therefore, for example, if an RFID transponder 702 requires an encoding signal with a strength of 10 dBm, then the adaptive control module 712 sets the transceiver's signal strength to 10.5 dBm, or higher in order to overcome noise losses in communications between the transceiver 708 and the transponder 702.

Likewise, in another embodiment the adaptive control module 712 adjusts the gain of the receiver portion of the transceiver 708 so that the transceiver 708 may detect a signal from a transponder 702 that otherwise may be missed. One embodiment of the receiver portion of the transceiver 708 includes a low noise amplifier (LNA) having an adjustable gain, as are known in the art. If in a generally noisy environment, the gain may be adjusted downward such that the signal from the transponder 702 may be distinguished from that of the background noise. If the environment is relatively quiet, then the gain of the transceiver 708 may be adjusted upward so that a less powerful transponder signal may be detected. Other transceivers 708 may have gain that is adjustable through software or have means for adjusting the gain other than a LNA.

Although FIG. 7A illustrates the transceiver 708, SNR module 710, and adaptive control module 712 as separate components and modules, it is contemplated under the present invention that one or more of those components or modules may be combined to perform the described functions and that separate processors or physical devices are not required for each component or module. Furthermore, it is to be noted that the system may function in various modes including adjusting the electromagnetic interrogation signal, the gain of the receiving portion of the transceiver, or both on a transponder-to-transponder basis, adjusting one or more of the interrogation signal and gain only once for a batch of transponders based on sampling the SNR of a certain number of the transponders, randomly sampling the SNR of some of the transponders and adjusting the interrogation signal, gain or both accordingly, etc.

Figure 7B:
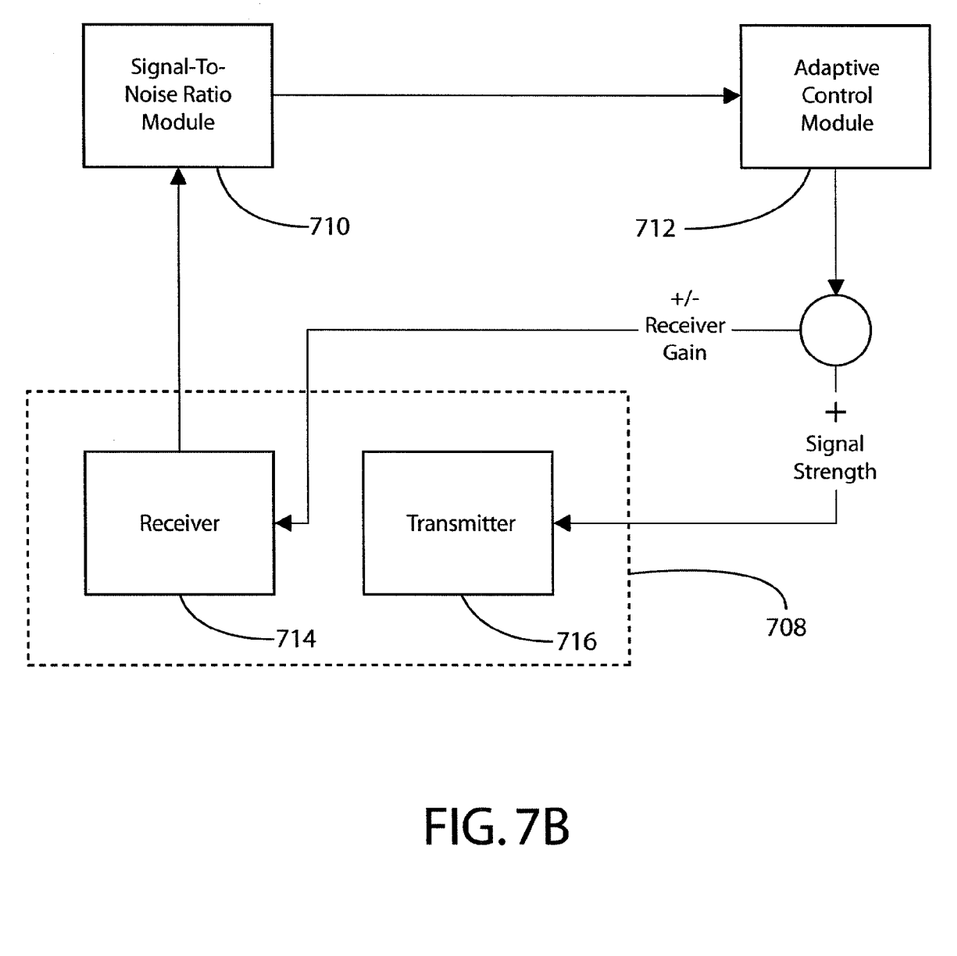
FIG. 7B is a control diagram representation of the block diagram of the embodiment of a system used to practice the invention shown in FIG. 7A.

FIG. 7B is a control diagram representation of the block diagram of the embodiment of the system used to practice the invention shown in FIG. 7A. In FIG. 7B the RFID transceiver 708 is represented by its receiver 714 and transmitter 716 components. The transmitter 716 first emits a first electromagnetic signal to an RFID transponder 702 (not shown FIG. 7B). This first electromagnetic signal may be to read the RFID transponder 702, to write (encode) it, to activate the RFID transponder 702, or a test signal for the purpose of determining the signal to noise ratio of the transponder 702. The RFID transponder 702 is activated by the first electromagnetic signal and responds by transmitting a response signal that is received by the receiver 714. The signal-to-noise ratio of the received response signal is determined by the signal-to-noise ratio module 710. Based upon the received signal-to-noise ration, the adaptive control module 712 determines whether to adjust the signal strength of the transmitter 716, adjust the gain of the receiver 714, do both, or do nothing. Adjustments, if any, are made in order to either encode or read information from the RFID transponder 702. If the gain is adjusted, it may be adjusted upwards if there is not an overabundance (as determined by the signal-to-noise ratio module 710 and the adaptive control module 712) of background noise. If there is a significant amount of background noise, then the gain may be adjusted downward so that the signal from the transponder 702 may be distinguished from the background noise.

Once adjustments are made to either, both, or neither of the gain of the receiver and the signal strength of the transmitter 716, the transmitter 716 sends an interrogation signal to the RFID transponder 702 to either encode or read the transponder 702. If reading the RFID transponder 702, the adjusted gain (if it was adjusted) of the receiver 714 will facilitate the reading of the response signal from the RFID transponder and if writing to the transponder 702, a fixed offset is applied to the "write" signal depending upon the signal to noise ratio.

Processes of Use of the Invention

Figure 8:
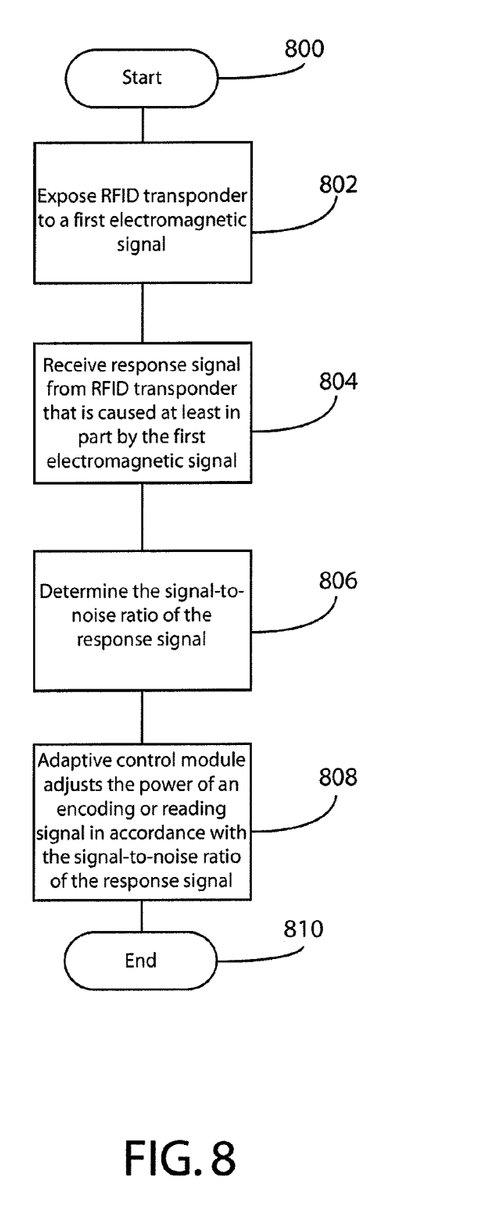
FIG. 8 is a flowchart illustrating an embodiment of a process for practicing the invention.
Figure 9:
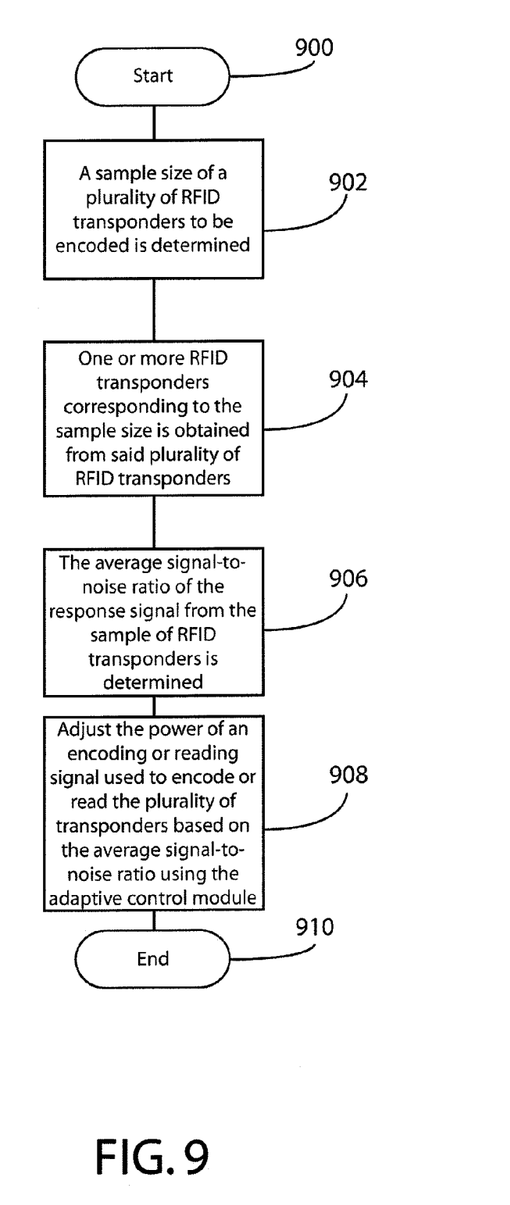
FIG. 9 is a flowchart illustrating another embodiment of a process for practicing the invention.

FIGS. 8 and 9 describe processes for use of the embodiments of the system described above for adjusting the signal strength of the transmitter 716 portion of the transceiver 708. The process of FIG. 8 starts at Step 800. Then at Step 802 a transponder is interrogated with a first electromagnetic signal. At Step 804, a response signal is received from the interrogated transponder, where the response signal was caused to be transmitted from the transponder by the first electromagnetic signal. At Step 806, the SNR of the response signal is determined. At Step 808, the SNR as determined in Step 806 is used to adjust the strength of a second electromagnetic signal that is used to either read or to encode the transponder. The process ends at Step 810. The process of FIG. 9 begins at Step 900. At Step 902 a sample size of a plurality of RFID transponders to be read or encoded is determined. This sample size may be based on statistical sampling techniques, as are known in the art. The sample size may also be arbitrarily or randomly determined as well. A sample size could include all of the plurality of transponders to be read or encoded, or it could only be one of the plurality of transponders. Also, it could be determined to sample, for example, only every other transponder, or every third transponder, etc, with the strength of the interrogation signal adjusted after each sample's SNR is determined. At Step 904, according to the determined sample size of the plurality of transponders, the SNR is determined for each transponder in the sample. Based on the sample size, at Step 906 an average SNR is determined which is used to calibrate the strength of an electromagnetic signal used to encode or read the plurality of RFID transponders. At Step 908, the power of an encoding or reading signal used to encode or read the plurality of transponders is adjusted based on the average signal-to-noise ratio using the adaptive control module. The process ends at Step 910.

Figure 10:
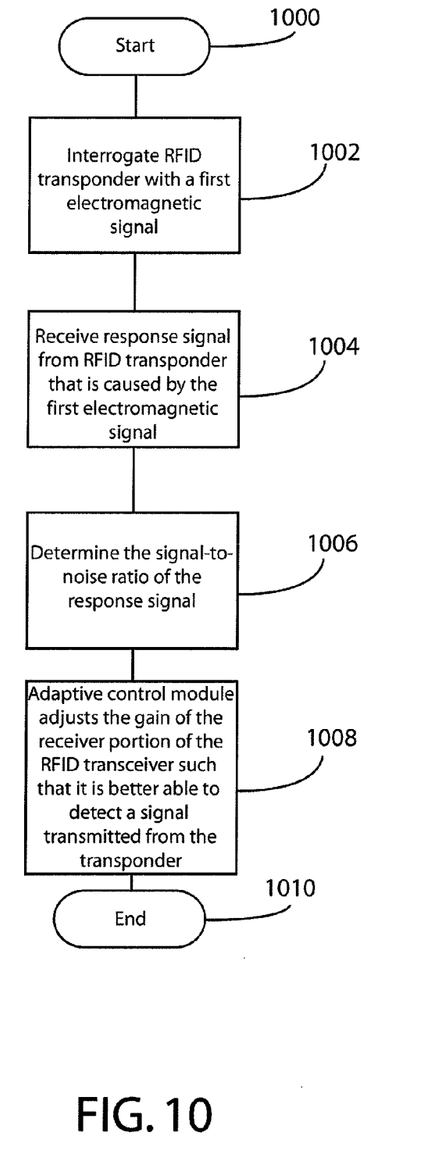
FIG. 10 is a flowchart illustrating another embodiment of a process for practicing the invention.

FIGS. 10 and 11 describe processes for use of the embodiments of the system described above for adjusting the gain of the receiver 714 portion of the transceiver 708. The process of FIG. 10 starts at Step 1000. At Step 1002 a transponder is interrogated with a first electromagnetic signal. At Step 1004, a response signal is received from the interrogated transponder, where the response signal was caused to be transmitted from the transponder by the first electromagnetic signal. At Step 1006, the SNR of the response signal is determined. At Step 1008, the SNR as determined in Step 1006 is used to adjust the gain of the receiver 714 portion of the RFID transceiver 708 such that it is better able to detect a signal transmitted from the transponder 702. The process ends at Step 1010.

Figure 11:
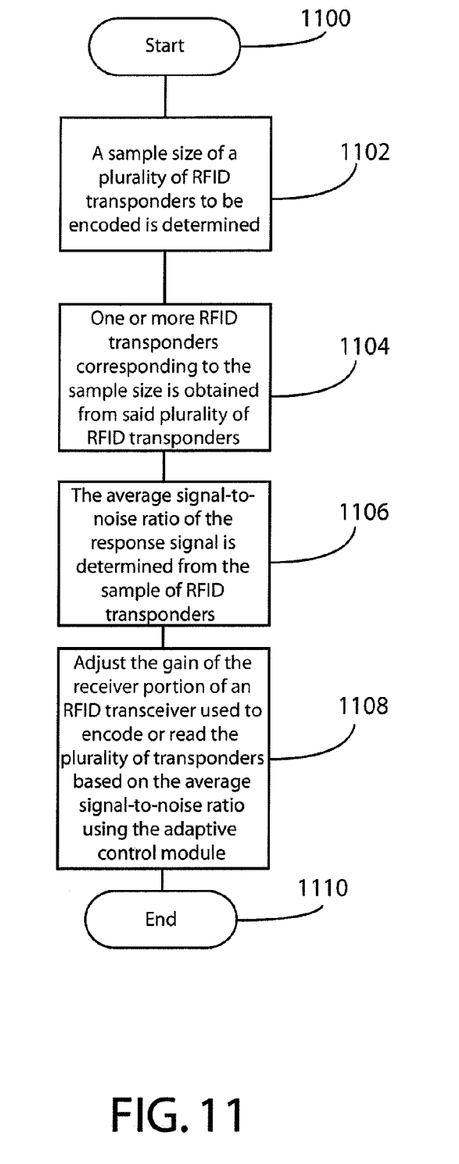
FIG. 11 is a flowchart illustrating another embodiment of a process for practicing the invention.

The process of FIG. 11 begins at Step 1100. At Step 1102, a sample size of a plurality of RFID transponders to be read or encoded is determined. This sample size may be based on statistical sampling techniques, as are known in the art. The sample size may also be arbitrarily or randomly determined as well. A sample size could include all of the plurality of transponders to be read or encoded, or it could only be one of the plurality of transponders. Also, it could be determined to sample, for example, only every other transponder, or every third transponder, etc, with the strength of the interrogation signal adjusted after each sample's SNR is determined. At Step 1104, according to the determined sample size, the SNR is determined for each transponder in the sample. Based on the sample size, at Step 1106 an average SNR is determined which, at Step 1108, is used to calibrate the gain of the receiver portion 714 of an RFID transceiver 708 that is to receive a signal transmitted from one or more of the plurality of transponders in response to an electromagnetic signal. The process ends at Step 1110.

Figure 12:
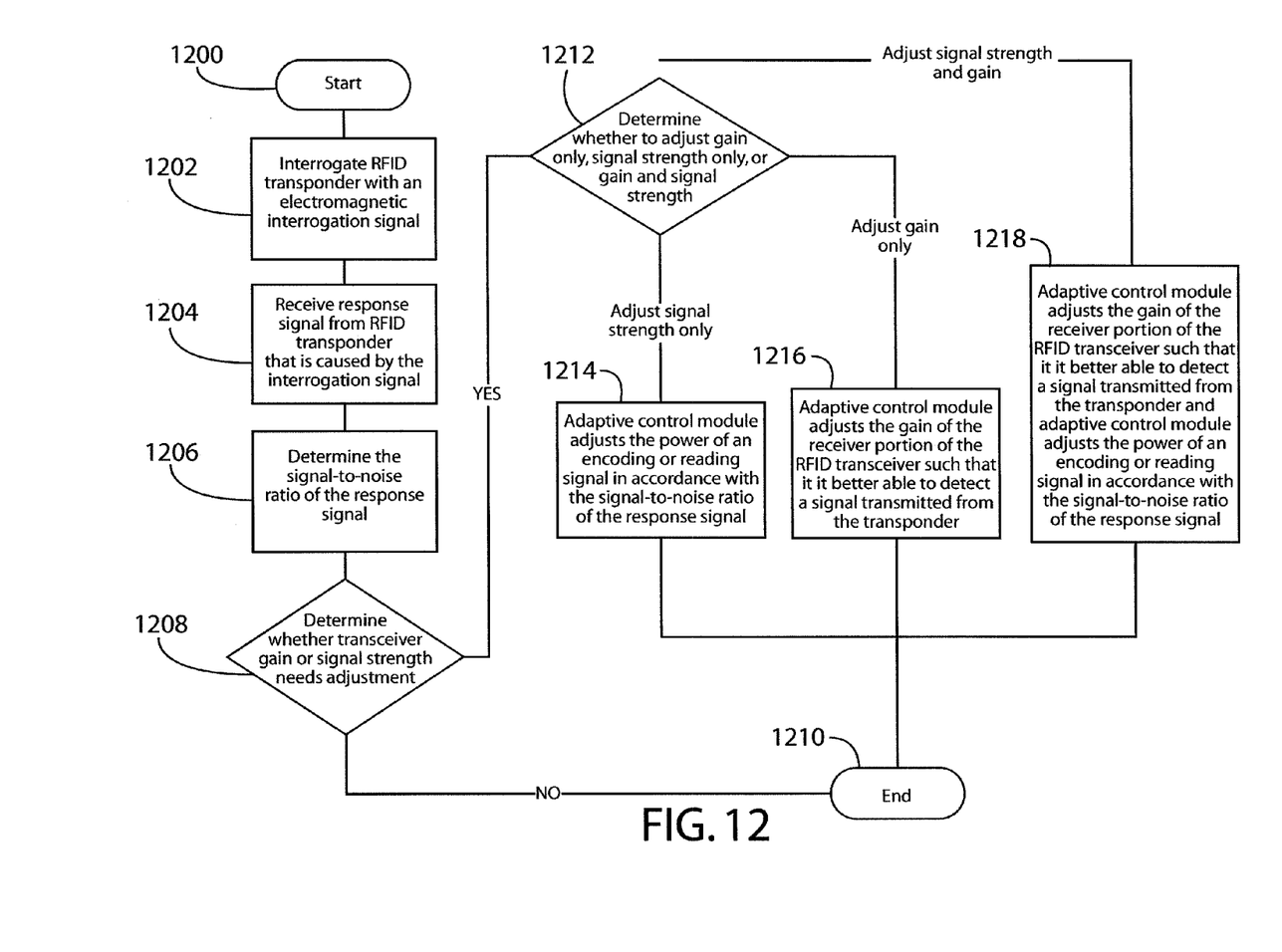
FIG. 12 is an embodiment of a process for encoding or reading information on an RFID transponder by adjusting either or both of the signal strength used to interrogate the transponder and the gain of a receiver used to receive a signal from the transponder.

FIG. 12 is a process for encoding or reading information on an RFID transponder by adjusting either or both of the signal strength used to interrogate the transponder and the gain of a receiver used to receive a signal from the transponder. The process of FIG. 12 starts at Step 1200. At Step 1202 a transponder is interrogated with a first electromagnetic signal. At Step 1204, a response signal is received from the interrogated transponder, where the response signal was caused to be transmitted from the transponder by the first electromagnetic signal. At Step 1206, the SNR of the response signal is determined. At Step 1208, it is determined whether the transceiver's gain, signal strength, or both gain and signal strength require adjustment in order for the transceiver to better communicate with the transponder. If, at Step 1208, no adjustment is required, then the process ends at Step 1210. If an adjustment is required, then the process continues to Step 1212 where it is determined whether to adjust only the gain of the receiver portion of the transceiver, adjust only the signal strength of the transmitter portion of the transceiver, or adjust both the gain and the signal strength of the transceiver. If it is determined at Step 1212 to adjust only the signal strength of the transmitter portion of the transceiver, then the process goes to Step 1214, where the adaptive control module adjusts the power of the interrogation signal in accordance with the SNR. If it is determined at Step 1212 to adjust only the gain of the receiver portion of the of the transceiver, then the process goes to Step 1216, where the adaptive control module adjusts the gain of the receiver such that the RFID transceiver is better able detect a signal transmitted from the transponder. If it is determined at Step 1212 that both the gain and the signal strength are to be adjusted, then the process goes to Step 1218 where the adaptive control module adjusts both the gain of the receiver portion of the transceiver and the signal strength of the transmitter portion of the transceiver.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the embodiments of the invention have been described as being incorporated into a printing device, but it is to be appreciated that this is just one of many uses of the systems and methods of the present invention. Other applications include the inventions use in any instance where RFID transponder encoding or reading occurs including the processing of more than one RFID transponder substantially concurrently. For instance, it is contemplated that an embodiment of the invention is to process a plurality of RFID transponders by substantially simultaneously transmitting a first electromagnetic signal to the RFID transponders and then determining the signal to noise ratio of each RFID transponder as it responds to the first electromagnetic signal. The determined SNR is then use to adjust the signal strength of a second electromagnetic signal and/or the gain of the transceiver. Although specific terms are employed herein, they are used in a generic and descriptive sense only and not for purposes of limitation.

What is claimed is:

1. A system for communicating with an RFID transponder comprised of:
    a receiver that is used to receive noise and a signal from said RFID transponder; and
    a signal-to-noise ratio module in communication with said receiver, wherein said signal-to-noise ratio module determines a signal-to-noise ratio from said signal and said noise received by said receiver;
        wherein said system encodes said RFID transponder, said signal used to determine said signal-to-noise ratio resulting from said RFID transponder; and
    an adaptive control module in communication with said signal-to-noise ratio module and said receiver,
        wherein based upon said signal-to-noise ratio, said adaptive control module adjusts a gain of said receiver to facilitate encoding said RFID transponder, and
        wherein, after adjusting said gain, said system encodes said RFID transponder.

2. The system of claim 1, wherein said receiver includes a low noise amplifier having an adjustable gain.

3. The system of claim 1, wherein said system comprises a portion of an RFID printer-encoder.

4. A system for communicating with an RFID transponder, comprising:
    a receiver that is used to receive noise and a signal from said RFID transponder;
    a signal-to-noise ratio module in communication with said receiver, wherein said signal-to-noise ratio module determines a signal-to-noise ratio from said signal and said noise received by said receiver;
        wherein said system encodes said RFID transponder, said signal used to determine said signal-to-noise ratio resulting from said RFID transponder; and
    an adaptive control module in communication with said signal-to-noise ratio module and said receiver,
        wherein based upon said signal-to-noise ratio, said adaptive control module adjusts a signal strength of an electromagnetic interrogation signal,
        wherein, after adjusting said signal strength, said system encodes said RFID transponder.

5. A method of communicating with a RFID transponder comprising:
    exposing said RFID transponder to a first electromagnetic signal;
    receiving a response signal from said RFID transponder that is in response to said first electromagnetic signal;
    receiving noise;
    determining a signal-to-noise ratio of said response signal and said noise;
    encoding said RFID transponder; and
    prior to encoding said RFID transponder, adjusting a signal strength of a transmitter portion of a transceiver, wherein said signal strength is determined by said signal-to-noise ratio of said response signal.

6. A method of communicating with a RFID transponder comprising:
    exposing said RFID transponder to a first electromagnetic signal;
    receiving a response signal from said RFID transponder that is in response to said first electromagnetic signal;
    receiving noise;
    determining a signal-to-noise ratio of said response signal and said noise;
    encoding said RFID transponder; and
    prior to encoding said RFID transponder, adjusting a gain of a receiver portion of a transceiver, wherein said gain is determined by said signal-to-noise ratio of said response signal.

7. A method of communicating with a RFID transponder comprising:
    exposing said RFID transponder to a first electromagnetic signal;
    receiving a response signal from said RFID transponder that is in response to said first electromagnetic signal;
    receiving noise;
    determining a signal-to-noise ratio of said response signal and said noise;
    encoding said RFID transponder; and
    prior to encoding said RFID transponder, adjusting both a signal strength of a transmitter portion of a transceiver and gain of a receiver portion of said transceiver, wherein said signal strength and said gain are determined by said signal-to-noise ratio of said response signal.

8. The method of claim 5 further comprising interrogating said RFID transponder with a second electromagnetic signal for the purpose of reading said RFID transponder.

9. The method of claim 6 further comprising interrogating said RFID transponder with a second electromagnetic signal for the purpose of reading said RFID transponder.

10. The method of claim 7 further comprising interrogating said RFID transponder with a second electromagnetic signal for the purpose of reading said RFID transponder.

11. The system of claim 4, wherein said receiver includes a low noise amplifier having an adjustable gain.

12. The system of claim 4, wherein said system comprises a portion of an RFID printer-encoder.

* * * * *